United States Patent [19]
Krokos

[11] 3,827,662
[45] Aug. 6, 1974

[54] CARGO TIE DOWN
[75] Inventor: Raymond M. Krokos, Detroit, Mich.
[73] Assignee: Evans Products Company,
Plymouth, Mich.
[22] Filed: Oct. 26, 1972
[21] Appl. No.: 300,880

Related U.S. Application Data
[63] Continuation of Ser. No. 110,038, filed Jan. 27, 1971, abandoned.

[52] U.S. Cl. .......................... 248/119 R, 248/361 R
[51] Int. Cl. .............................................. B65j 1/22
[58] Field of Search ........ 248/119 R, 361 R, 361 A; 308/237 A

[56] References Cited
UNITED STATES PATENTS
| | | | |
|---|---|---|---|
| 2,449,600 | 9/1948 | Geiger | 248/361 A |
| 3,158,108 | 11/1964 | Sharp | 248/361 R |
| 3,564,577 | 2/1971 | Blunden et al. | 105/369 A |

*Primary Examiner*—Edward C. Allen
*Attorney, Agent, or Firm*—Harness, Dickey & Pierce

[57] ABSTRACT

A device for tying down cargo, particularly motor vehicles, during shipment. The tiedown device has a simplified, compact arrangement that facilitates assembly and disassembly. A thrust taking member is fixed to a shaft on which a flexible transmitter is wound and is positioned between a pair of supporting members for absorbing lateral thrust.

6 Claims, 7 Drawing Figures

PATENTED AUG 6 1974 3,827,662

INVENTOR.
Raymond M. Krokos.
BY
Harness, Dickey & Pierce
ATTORNEYS.

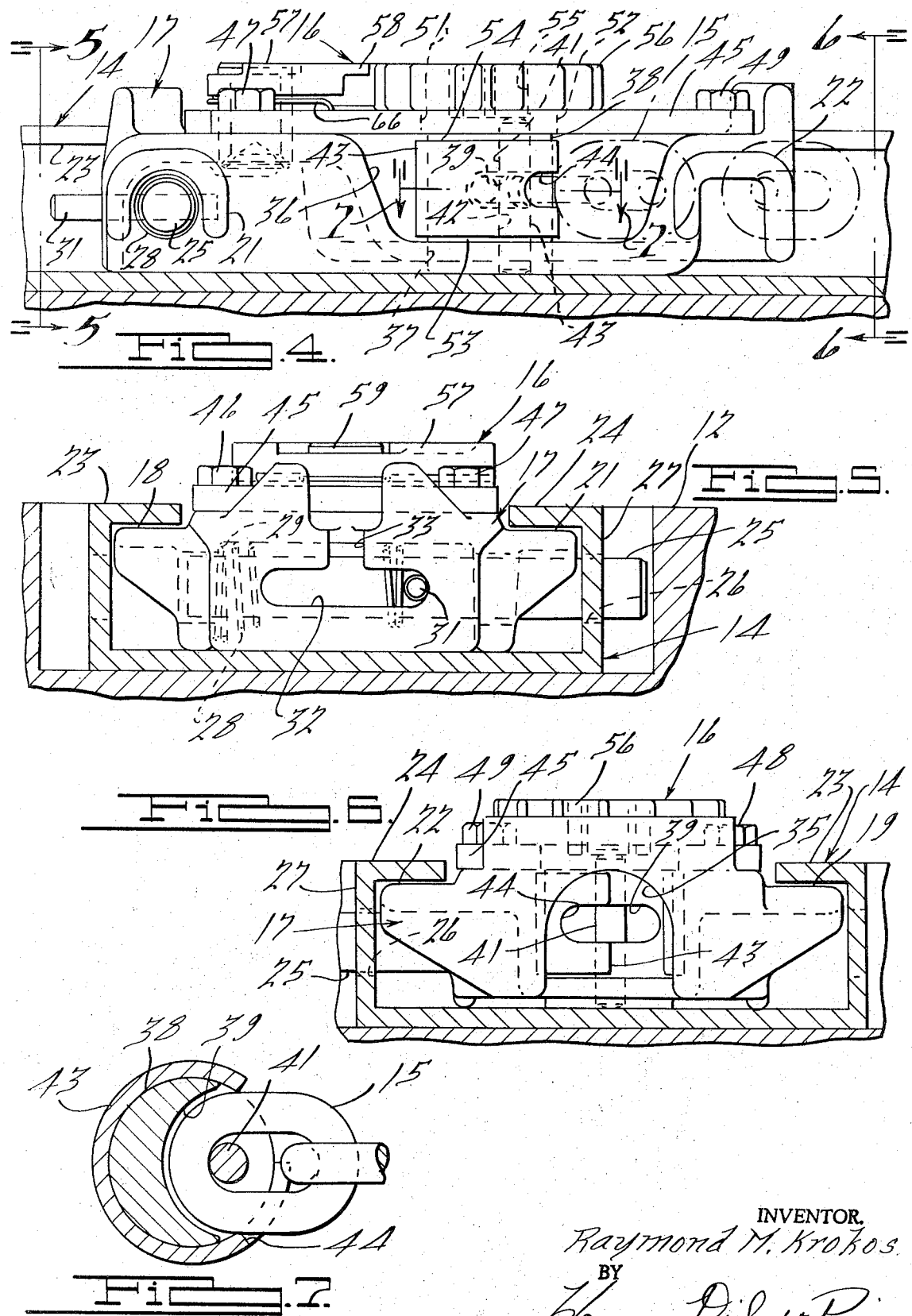

CARGO TIE DOWN

This is a continuation of application Ser. No. 110,038, filed Jan. 27, 1971 and now abandoned.

BACKGROUND OF THE INVENTION

This invention relates to a cargo tie down device and more particularly to an improved tie down for holding cargo against movement during shipment.

One commonly used type of cargo tie down includes a tie down member that is fixed within a track carried by a transporting vehicle and which incorporates a winch for tightening a flexible transmitter that is connected to the cargo. This type of tie down is frequently used in connection with the shipping of motor vehicles. In order to permit a lower overall profile for the tie down device, it has been proposed to position the axis of the winch in a somewhat vertical direction. Although such an arrangement has a more compact height, the shaft of the winch experiences considerable transverse loading. It is, therefore necessary to provide some form of thrust taking arrangement for the winch shaft. This is difficult, however, without unduly adding to the cost of the assembly or without making the device difficult to service.

It is, therefore, a principal object of this invention to provide an improved, low cost cargo tie down device.

It is another object of the invention to provide a cargo tie down device embodying an improved and simplified thrust bearing relationship.

SUMMARY OF THE INVENTION

A cargo tie down embodying this invention is particularly adapted for holding cargo during shipment. The tie down comprises a pair of spaced members that define aligned bearing openings in which spaced portions of a shaft are journalled. The shaft provides means for effecting a connection to a flexible transmitter. Means are provided for rotating the shaft for tensioning the attached flexible transmitter. A thrust member is axially affixed to the shaft between its journaled portions. The thrust member has portions engageable with the members adjacent their respective bearing openings for limiting the axial movement of the shaft relative to the members.

BRIEF DESCRIPTION OF THE DRAWINGS

FIG. 4 is a side elevational view of the tie down shown in FIG. 2.

FIG. 5 is a sectional view taken along the line 5—5 of FIG. 4 showing one end of the tie down.

FIG. 6 is a sectional view taken along the line 6—6 of FIG. 4 showing the other end of the tie down.

FIG. 7 is a cross-sectional view taken along the line 7—7 of FIG. 4 showing the connection with the flexible transmitter to the tie down shaft.

DETAILED DESCRIPTION OF THE PREFERRED EMBODIMENT

Figure 1:
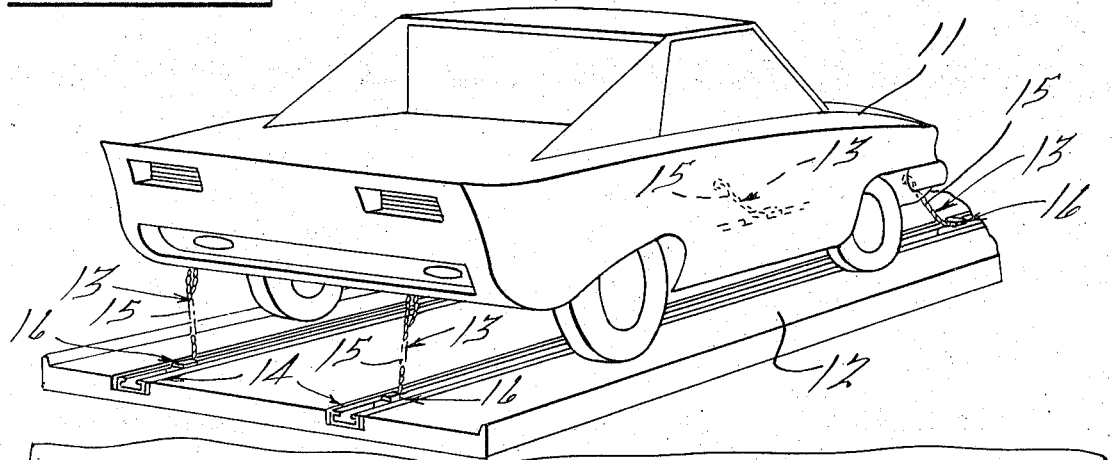
FIG. 1 is a persepctive view of a portion of an automobile transporting railway car embodying the invention.

FIG. 1 illustrates this invention as embodied in the shipment of an automobile 11 upon the deck 12 of a specially constructed railway car. The automobile 11 is held against movement relative to the deck 12 by means of tie down assemblies, indicated generally by the reference numeral 13 positioned at the four corners of the automobile 11. At each side of the automobile 11 the tie down assemblies 13 coact with tracks, indicated generally by the reference numeral 14, which tracks are recessed in the deck 12.

Referring now to the remaining Figures, the tie down assembly 13 includes a chain or other flexible transmitter 15 that is adapted to be connected by means of a hook or the like to the cargo to be tied down, in this case to the automobile 11. The chain 15 is connected at its other end to a tie down fitting, indicated generally by the reference numeral 16. The tie down fitting 16 includes a winch, also to be described, that is adapted to tension the chain 15.

The tie down fitting 16 includes a base member 17 that may be formed as a stamping, forging or casting. The base member 17 has four outwardly extending lugs 18, 19, 21 and 22 that underlie inwardly extending flanges 23 and 24 of the track 14. At least the lugs 18 and 21 are apertured and slidably support a locking pin 25. The locking pin 25 is adapted to enter one of preselected openings 26 formed in an upstanding leg 27 of the track 14 for holding the tie down fitting 16 against longitudinal movement relative to the track 14.

The lock pin 25 is urged to a locked position by means of a coil spring 28 that encircles the pin 25 and which bears at one end against a shoulder 29 formed adjacent the aperture in the lug 18. The other end of the spring 28 bears against a release pin 31 that is fixed to the lock pin 25. The release pin extends through an inverted T-shaped slot formed in the rear face of the base member 17. This T-shape slot includes a horizontal extending portion 32 and a vertical extending portion 33. The lock pin 25 may be released by moving the release pin 31 along the slot leg 32 until it registers with the slot leg 33. At this time, the release pin 31 and lock pin 25 are rotated through approximately 90° so that the release pin 31 will be captured within the slot portion 33. The lock pin 25 is then retained in a released position and the tie down fitting 16 may be moved to a new longitudinal position within the track 14. When in the desired position, the release pin 31 is rotated along with the locking pin 25 from the slot portion 33 to the slot portion 32. The spring 28 will then urge the locking pin 25 outwardly and if it is in registry with an opening 26 it will enter this opening. If not, the tie down fitting 16 is moved a slight distance in either longitudinal direction until the pin 25 does register with one of the openings 26.

The forward end of the base member 17 is formed with an opening 35 through which the chain 15 may pass. Adjacent the opening 35, the base member 17 is formed with a depressed central pocket 36. At the center of this pocket, the base member is formed with a cylindrical opening 37 in which the lower end of a shaft 38 is journaled. The shaft 38 is formed with a slot 39 (FIG. 7) into which the end link of the chain 15 is inserted. A pin 41 extends through the shaft 38 and specifically through a bore 42 in the shaft 38. The bore 42 intersects the slot 39 so that the pin 41 passes through an opening in the chains end link. It should be noted that the bore 42 extends upwardly through the bottom of the shaft 38 and terminates a short of the upper end of the shaft 38. Thus, the pin 41 is inserted through the lower end of the shaft 38.

A thrust taking sleeve 43 encircles the shaft 38 and is provided with a slot 44 that is aligned with the shaft pocket 39. The slot 44 receives the end chain link and the chain 15, therefore, axially positions the thrust taking sleeve 43 upon the shaft 38.

A plate member 45 is fixed to the upper side of the base member 17 by means of four bolts 46, 47, 48 and 49. The bolts 46 through 49 are received in tapped openings formed in the base member 17. The plate 45 closes the pocket 36 and has a bore 51 that journals an enlarged diameter portion 52 of the shaft 38. Thus, the shaft 38 is journaled in the spaced bores 37 and 51 of the base member 17 and plate 45. The thrust taking sleeve 43 has opposed end surfaces 53 and 54 that are juxtaposed to the surfaces of the base member 17 and plate 45 around their respective bores 37 and 51. The diameter of the sleeve 43 is greater than the diameter of either of these bores so that the sleeve surfaces 53 and 54 will act to take in axial thrust on the shaft 38.

Figure 3:
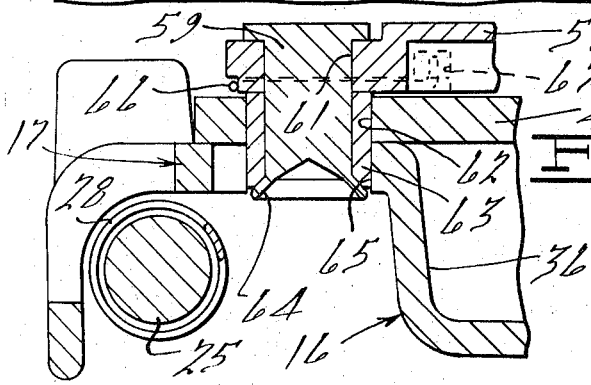
FIG. 3 is a cross sectional view taken along the line 3—3 of FIG. 2.

The upper end of the shaft 38 is formed with a socket opening 55 to receive a suitable tool for rotating the shaft 38 and tensioning the chain 15. The tie down fitting 16, therefore, in addition to anchoring one end of the chain 15 functions as a winch for tensioning this chain. Integrally formed on the shaft 38 above the enlarged diameter portion 52 is a ratchet wheel portion 56 that has outwardly projecting teeth. A pawl 57 has an extending portion 58 that coacts with the teeth of the ratchet wheel 56 for permitting rotation of the shaft 38 in one direction and for precluding rotation in the opposite sense. The pawl 57 is journaled upon a shaft 59 that extends through a bore 61 in the pawl 57 and through a larger diameter bore 62 formed in the plate 45. An anti-friction bushing 63 is interposed between the bore 62 and the shaft 59. The bushing 63 is affixed, as by brazing to the plate 45 and rotatably supports the shaft 59 and pawl 57. The bushing 63 is axially affixed to the shaft 59 by means of a staked over portion 69 of the latter (FIG. 3). The bushing 63 also extends through an aperture 65 formed in the base member 17.

Figure 2:
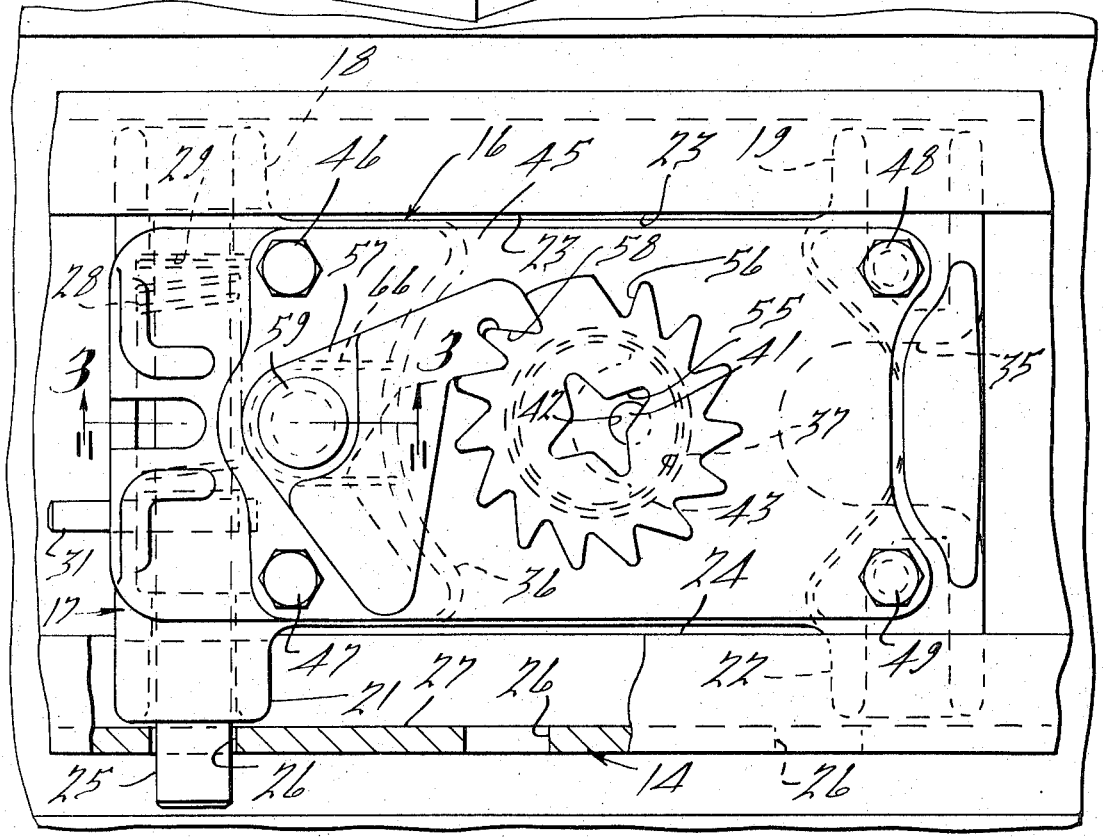
FIG. 2 is a top plan view, with a portion broken away, of the car showing the details of one of the tie down devices.

The pawl portion 58 is urged into its locking engagement with the teeth of the ratchet wheel 56 by means of a torsional spring 66 that has a portion which encircles the part of the pawl 56 that receives the shaft 59. One end of the torsional spring 66 is received within a pocket 67 formed in the pawl 57 (FIG. 3). The other end of the spring 66 is engaged in a pocket formed in the plate 45 (not shown) so as to exert a clockwise bias on the pawl 57 as viewed in FIG. 2.

The method of loading an automobile 11 onto the deck 12 is believed to be apparent. The tie down fittings 16 are appropriately positioned in the tracks 14 and are locked in place by the locking pins 25. The automobile 11 is then appropriately positioned and the outer ends of the chains 15 are attached to appropriate portions of the vehicle. A tool is then inserted in the socket opening 55 of the shaft 37 and the shaft is rotated in a clockwise direction as viewed in FIG. 2 to tension the chains 15. When the chains 15 are tightened, some axial thrust will be exerted upon the shaft 38. The thrust taking sleeve 43 will limit the axial movement of the shaft 38 and will transmit the force over a relatively large bearing area as provided by these end surfaces 53 and 54.

In addition to providing an effective thrust taking arrangement the described tie down attachment fitting lends itself to convenient assembly and disassembly for servicing. Also, a relatively low cost assembly is provided by the described construction. The chain 15 may be readily removed by taking the tie down attachment fittings 16 from within the track 14. The pin 41, which is press fitted into the bore 42 can then be driven out through the bottom of the base member 17 by applying an axial force through the portion of the bore 42 exposed at the base of the socket opening 55. The shaft 37 may also be conveniently replaced by merely drawing it upwardly when the chain 15 is removed. Thus, the thrust taking arrangement provides for convenient disassembly and requires no expensive thrust bearings.

It is to be understood that the foregoing description is that of a preferred embodiment of the invention. Various changes and modifications may be made without departing from the spirit and scope of the invention as defined by the appended claims.

I claim:

1. A cargo tie down or the like comprising a pair of spaced members defining aligned bearing openings, a shaft having spaced portions journaled in said bearing openings, said shaft having a pocket formed therein in which an end link of a chain is received, a bore formed within said shaft and extending through said pocket, a pin extending through said bore and through the end link of said chain for fixing said chain to said shaft, said shaft being configured to permit said shaft to be moved axially into the aligned bearing opening of said members from one side to the other when said members are fixed in their spaced relationship, said members having facing surfaces adjacent said bearing opening spaced axially a greater distance than the effective diameter of the flexible transmitter to provide a clearance therebetween, means for rotating said shaft for tensioning the attached flexible transmitter, and a thrust member bushing positioned on said shaft between its journaled portions, said bushing having a cut out portion receiving said chain end link for axially affixing said bushing to said shaft, said bushing having portions engageable with said facing surfaces of said members adjacent their respective bearing openings for limiting the axial movement of said shaft relative to said members.

2. A cargo tie down or the like as set forth in claim 1 further including ratchet means for precluding reverse rotation of the shaft when the flexible transmitter is tensioned.

3. A cargo tie down or the like as set forth in claim 2 wherein the ratchet means includes a ratchet wheel integrally formed with the shaft and positioned on one side of one of the members.

4. A cargo tie down device or the like comprising a base member having means for affixing said tie down to a track or the like, said base member defining a pocket with a bearing opening at the base thereof, a plate affixed to said base member, said plate having a bearing opening formed therein aligned with the bearing opening of said base member, a shaft having portions journaled in said bearing openings, a ratchet wheel formed on said shaft and juxtaposed to said plate, a pawl for holding said shaft against rotation through coaction with said ratchet wheel, said shaft having a socket opening formed adjacent said ratchet wheel for facilitating rotation of said shaft, said shaft having a transversely extending pocket formed therein between its journaled portions, said pocket being adapted to receive an end link of a chain, a bore formed in said shaft and intersecting said pocket, said bore being adapted to receive a pin for locking the chain and link within said shaft pocket, and a thrust bearing sleeve encircling said shaft and extending between the bearing openings of said base member and said plate, said bearing sleeve having a slot formed therein aligned with said shaft pocket and adapted to be engaged by the chain end link for axially affixing said thrust bearing sleeve to said shaft.

5. A cargo tie down device or the like as set forth in claim 4 wherein the bore in the shaft extends through the end of the shaft remote from the ratchet wheel portion for removal of the pin therefrom without disassembly of the plate from the base member.

6. A cargo tie down device or the like as set forth in claim 5 wherein at least a portion of the bore extends into the socket opening for driving of the pin therefrom.

* * * * *